UNITED STATES PATENT OFFICE.

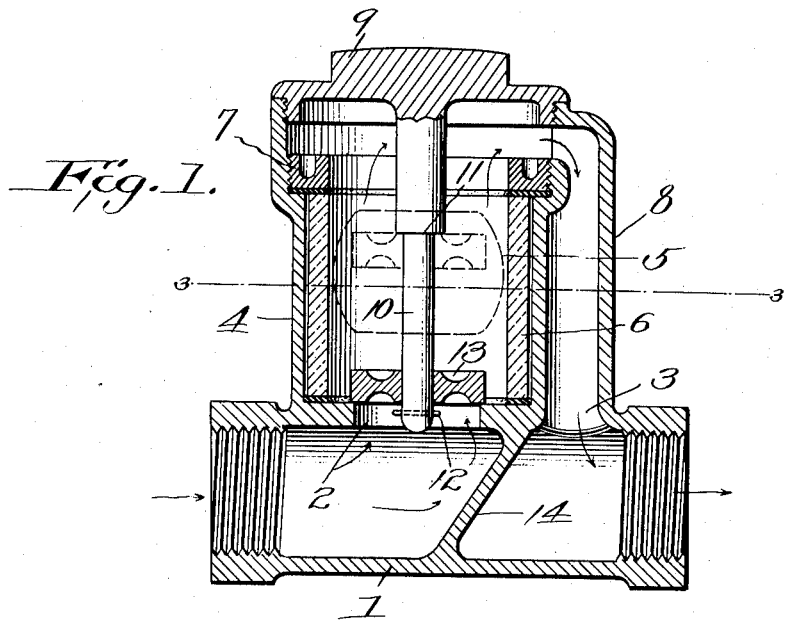
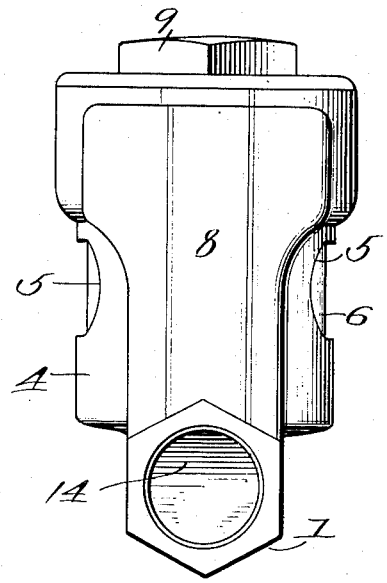
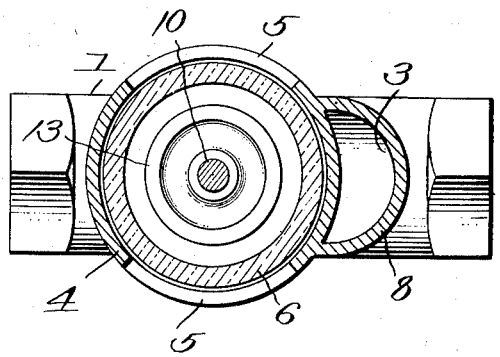

GUSTAVE KOEHLER, JR., OF CINCINNATI, OHIO.

FLUID-CIRCULATING INDICATOR.

1,038,155.

Specification of Letters Patent. Patented Sept. 10, 1912.

Application filed January 29, 1912. Serial No. 674,053.

*To all whom it may concern:*

Be it known that I, GUSTAVE KOEHLER, Jr., a citizen of the United States, residing at Cincinnati, in the county of Hamilton and State of Ohio, have invented a new and useful Improvement in Fluid-Circulating Indicators, of which the following is a specification.

This invention relates to a device for indicating the circulating of a fluid through a gage, and comprises a suitable gage along with means for directing water from a pipe upwardly into the gage and then passing the water back again to the pipe, a metal float being arranged in the gage, the said float being forced by the current of water into the upper portion of the gage when the water is freely circulating, and dropping to the bottom of the gage when the water ceases to circulate, or when the circulation is so slow that the current through the gage does not exert sufficient pressure to maintain the float in elevated position.

In the accompanying drawings, Figure 1 is a vertical section through the device. Fig. 2 is an end view, looking toward the right of Fig. 1. Fig. 3 is a horizontal section on the line 3—3 of Fig. 1.

In the drawings, 1 represents a water pipe section which is adapted to be inserted in the pipe system through which the circulation is to be maintained. This pipe section is provided upon its upper side with openings 2 and 3 and upon said upper side is formed a cylindrical casing 4, cut out upon opposite sides as shown at 5 to form sight openings and within said casing is arranged a cylindrical glass gage 6. This gage is concentric with the opening 2 in the top of the pipe 1. The gage is held in place by a suitable nut 7, which is threaded into the upper portion of the casing 4 and bears upon the upper portion of the gage, suitable packing material being of course placed at both top and bottom of the gage. A hollow side extension 8 semi-cylindrical in cross section is carried by one side of the casing 4 and communicates with the upper portion of the casing, above the gage and also with the pipe 1 through the opening 3. As shown in Fig. 1, the pipe, the casing and extension 8 can all be cast in one piece. The upper end of the casing 4 is closed by a suitable threaded cap 9, which is provided with a depending pin 10, which pin is provided with a shoulder 11 adjacent the upper edge of the sight openings 5 and with a transverse pin 12 adjacent the lower end of the pin 10. An aluminum float 13, is slidably mounted upon the pin 10 and upward movement of said float is stopped by the shoulder 11. The float normally rests upon the seat formed by the opening 2, the diameter of the float being slightly greater than that of said opening. The pin 12 prevents the float from slipping from off the pin 10, when the cap 9 is unscrewed and the pin 10 withdrawn from the gage.

In order to throw the water through the gage and through the passage in the extension 8, an inclined wall 14 is formed in the pipe 1 between the openings 2 and 3, the inclination of the wall being such as to direct the current of water upwardly through the opening 2. As long as there is a circulation of water in the direction of the arrows, the float 13 will be held in the position shown in dotted lines in Fig. 1 but if the circulation is stopped for any reason the float will fall into the position shown in full lines.

What I claim is:

1. The combination with a water pipe having two openings in its upper side, an inclined partition in said pipe and between said openings, a gage in communication with both of said openings and a float formed of a material which would normally sink, said float being arranged in said gage and in alinement with one of said openings.

2. The combination with a pipe, of a gage mounted upon the upper side of the pipe, a hollow extension carried by one side of said gage and communicating with the top of the gage and also communicating at its bottom with the pipe, said pipe having also an opening communicating with the bottom of the gage, an inclined wall arranged in the pipe between the gage and the extension and adapted to direct the current of water through the last mentioned opening into the gage, and a metal float arranged in said gage and in alinement with said opening.

3. A device of the kind described comprising a pipe, a metal casing having sight openings therein, said casing being mounted upon the pipe, the pipe having an opening on its upper side concentric with said casing, a glass gage arranged in the casing, a cap inclosing the casing, a depending pin centrally carried by the cap, a metal float slidable upon said pin, a side extension carried by the casing, said extension communicating at the top with the upper portion of the casing and at the bottom with the pipe, and a partition arranged in the pipe between the opening communicating with the casing and the said extension, as and for the purpose set forth.

GUSTAVE KOEHLER, Jr.

Witnesses:
FRANK C. MUSTIN,
GUSTAVE KOEHLER, SR.